United States Patent
Knop et al.

(10) Patent No.: US 7,332,534 B2
(45) Date of Patent: *Feb. 19, 2008

(54) FLAME RETARDANT FORMULATION

(75) Inventors: Susanne Knop, Hamburg (DE); Martin Sicken, Cologne (DE); Sebastien Hoerold, Diedorf (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 402 days.

This patent is subject to a terminal disclaimer.

(21) Appl. No.: 10/890,427

(22) Filed: Jul. 13, 2004

(65) Prior Publication Data

US 2005/0014875 A1    Jan. 20, 2005

(30) Foreign Application Priority Data

Jul. 14, 2003 (DE) ................ 103 31 887

(51) Int. Cl.
*C08K 5/5313* (2006.01)

(52) U.S. Cl. .............. 524/126; 524/133; 524/134; 252/609; 252/610

(58) Field of Classification Search ............ 524/126, 524/133, 135; 252/609–610
See application file for complete search history.

(56) References Cited

U.S. PATENT DOCUMENTS

| | | | |
|---|---|---|---|
| 3,900,444 A | | 8/1975 | Racky et al. |
| 4,036,811 A | | 7/1977 | Noetzel et al. |
| 4,078,016 A | | 3/1978 | Kramer |
| 4,087,403 A | | 5/1978 | Moedritzer |
| 4,097,400 A | | 6/1978 | Wortmann et al. |
| 4,308,197 A | | 12/1981 | Byrd et al. |
| 5,334,644 A | * | 8/1994 | Gose et al. ............ 524/487 |
| 5,780,534 A | | 7/1998 | Kleiner et al. |
| 6,013,707 A | | 1/2000 | Kleiner et al. |
| 6,255,371 B1 | | 7/2001 | Schlosser et al. |
| 6,365,071 B1 | | 4/2002 | Jenewein et al. |
| 6,420,459 B1 | | 7/2002 | Horold |
| 6,646,030 B2 | | 11/2003 | Heinen et al. |
| 2004/0192812 A1 | * | 9/2004 | Engelmann et al. ...... 524/100 |

FOREIGN PATENT DOCUMENTS

| | | | |
|---|---|---|---|
| DE | 2252258 | | 5/1974 |
| DE | 2447727 | | 4/1976 |
| DE | 19614424 | | 10/1997 |
| DE | 19903707 | | 8/2000 |
| DE | 19933901 | | 2/2001 |
| DE | 101 37 930 | * | 2/2003 |
| EP | 0699708 | | 3/1996 |
| WO | WO 96/16948 | | 6/1996 |
| WO | WO 97/39053 | | 10/1997 |
| WO | WO 98/39306 | | 9/1998 |

OTHER PUBLICATIONS

U.S. Appl. No. 10/794,019, by Sicken et al., Mar. 5, 2004.
U.S. Appl. No. 11/065,767, by Staib et al., Feb. 25, 2005.
U.S. Appl. No. 11/143,059, filed Jun. 2, 2005, by Bauer et al.
U.S. Appl. No. 11/093,599, by Bauer et al., filed Mar. 30, 2005.
U.S. Appl. No. Office Action for U.S. Appl. No. 10/669,921, mailed Sep. 14, 2005.

* cited by examiner

*Primary Examiner*—Peter Szekely
(74) *Attorney, Agent, or Firm*—Anthony A. Bisulca

(57) ABSTRACT

The invention relates to a novel flame retardant formulation for thermoplastic and thermoset polymers, containing, as flame retardant component A, from 90 to 99.9% by weight of phosphinate salt of the formula (I) and/or a diphosphinate salt of the formula (II) and/or polymers thereof

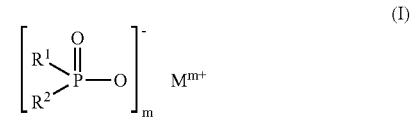

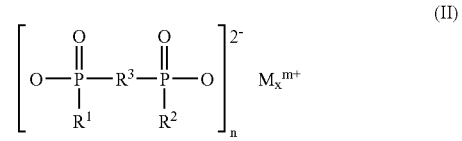

where
$R^1$, $R^2$ are the same or different and are each $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na and/or K;
m is from 1 to 4;
n is from 1 to 4;
x is from 1 to 4
and, as component B, from 0 to 50% by weight of a nitrogen-containing synergist or of a phosphorus/nitrogen flame retardant and, as component C, from 0.1 to 10% by weight of a liquid component.

35 Claims, No Drawings

FLAME RETARDANT FORMULATION

The present invention is described in the German priority application No. 10331887.9 filed 14 Jul. 2003, which is hereby incorporated by reference as is fully disclosed herein.

The present invention relates to a flame retardant formulation, to a process for preparing said flame retardant formulation and to the use thereof.

Organophosphorus compounds find use as flame retardants for thermoplastic and thermoset polymers, for example polyamides, polyesters, unsaturated polyester resins and epoxy resins.

The salts of phosphinic acids (phosphinates) in particular have been found to be effective flame-retardant additives; this is true both of the alkali metal salts (DE-A-2 252 258) and of the salts of other metals (DE-A-2 447 727).

Calcium phosphonates and aluminum phosphinates have been stated to be particularly effective in polyesters and impair the material properties of the polymer molding compositions to a lesser extent than the alkali metal salts (EP-A-0 699 708).

In addition, synergistic combinations of phosphinates with certain nitrogen compounds have been found, which are more effective as flame retardants in a whole series of polymers than the phosphinates alone (U.S. Pat. No. 6,255,371, DE-A-196 14 424, DE-A-199 03 707).

Owing to their combustibility, thermoplastic and thermoset polymers, for example polyamides, polyesters, unsaturated polyester resins, epoxy resins and polyurethanes, need flame retardants for some applications. Increasing demands of the market for fire protection and for environmental compatibility of products are increasing the interest in halogen-free flame retardants, for example solid organophosphorus flame retardants or combinations of such products with further flame retardants, preferably nitrogen-containing synergists or phosphorus-nitrogen flame retardants.

In the aforementioned fields of application, the processing of the solid organophosphorus flame retardant component can be complicated in particular when liquid components are used in the processing operation. There exists the risk that the flame retardant is not homogeneously incorporated successfully during the processing owing to inadequate dispersion or wetting.

U.S. Pat. No. 4,097,400 describes mixtures of the solid flame retardant ammonium polyphosphate in polyols for preparing polyurethanes.

It is thus an object of the present invention to improve the processibility and dispersibility of flame retardant formulations. According to the invention, this object is achieved by admixing and homogenizing the organophosphorus flame retardant component with a liquid component before the polymer processing operation. It has been found that, surprisingly, the uniformity of the distribution of the organophosphorus flame retardant component in the polymer is improved when it is used in the form of a pretreated formulation. The particles having better distribution result in more effective flame retardancy. Further results of the better particle distribution are better and more esthetically pleasing surface properties and surface quality. In addition, better mechanical properties of the polymeric material may thus be achieved.

The invention therefore relates to flame retardant formulations which contain, as flame retardant component A, from 90 to 99.9% by weight of phosphinate salt of the formula (I) and/or a diphosphinate salt of the formula (II) and/or polymers thereof

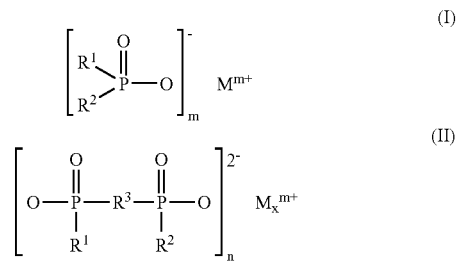

where
$R^1$, $R^2$ are the same or different and are each $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na and/or K;
m is from 1 to 4;
n is from 1 to 4;
x is from 1 to 4 and, as component B, from 0 to 50% by weight of a nitrogen-containing synergist or of a phosphorus/nitrogen flame retardant and, as component C, from 0.1 to 10% by weight of a liquid component.

Preferably, $R^1$, $R^2$ are the same or different and are each $C_1$-$C_6$-alkyl, linear or branched, and/or phenyl.

More preferably, $R^1$, $R^2$ are the same or different and are each methyl, ethyl, n-propyl, isopropyl, n-butyl, tert-butyl, n-pentyl and/or phenyl.

Preferably, $R^3$ is methylene, ethylene, n-propylene, isopropylene, n-butylene, tert-butylene, n-pentylene, n-octylene or n-dodecylene.

Preferably, $R^3$ is also phenylene or naphthylene.

Preferably, $R^3$ is also methylphenylene, ethylphenylene, tert-butylphenylene, methylnaphthylene, ethylnaphthylene or ter-butylnaphthylene.

Preferably, $R^3$ is also phenylmethylene, phenylethylene, phenylpropylene or phenylbutylene.

Preferably, M is calcium, aluminum or zinc.

Protonated nitrogen bases preferably refer to the protonated bases of ammonia, melamine, triethanolamine, especially $NH_4^+$.

Also in accordance with the invention are flame retardant compositions which comprise synergistic combinations of the phosphinates mentioned with certain compounds which are more effective as flame retardants in a whole series of polymers than the phosphinates alone. The flame retardancy of the phosphinate mixtures may be improved by combination with further flame retardants, preferably nitrogen-containing synergists or phosphorus/nitrogen flame retardants.

The nitrogen synergists are preferably those of the formulae (III) to (VIII) or mixtures thereof

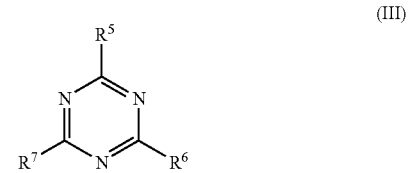

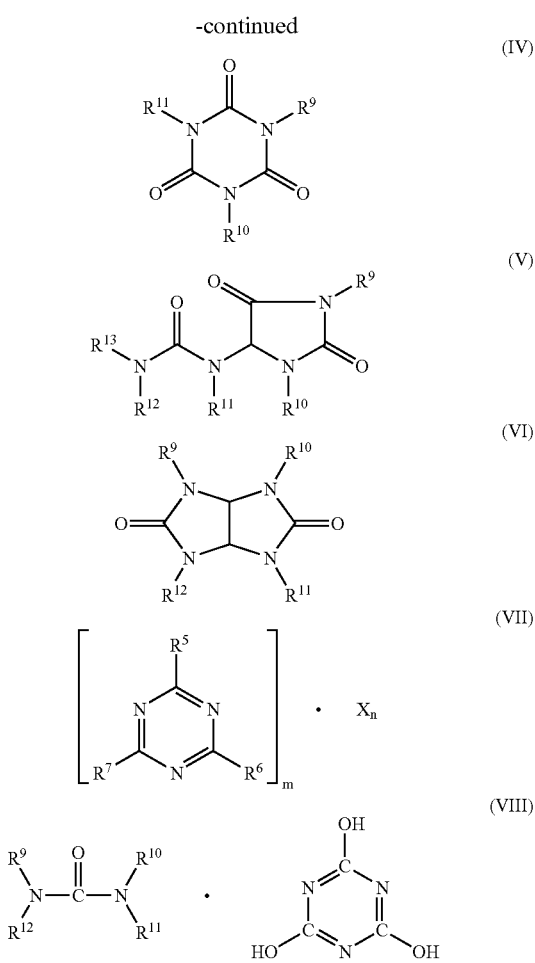

where

R[5] to R[7] are each hydrogen, $C_1$-$C_8$-alkyl, $C_5$-$C_{16}$-cycloalkyl or -alkylcycloalkyl, possibly substituted by a hydroxyl or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —OR[8] and —N(R[8])R[9], either N-alicyclic or N-aromatic, R[8] is hydrogen, $C_1$-$C_8$-alkyl, $C_5$-$C_{16}$-cycloalkyl or -alkylcycloalkyl, possibly substituted by a hydroxyl or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl, R[9] to R[13] are each the same groups as R[8] and also —O—R[8], m and n are each independently 1, 2, 3 or 4, X are acids which can form adducts with triazine compounds (III);

or are oligomeric esters of tris(hydroxyethyl)isocyanurate with aromatic polycarboxylic acids.

The nitrogen-containing synergists are more preferably benzoguanamine, tris(hydroxyethyl) isocyanurate, allantoin, glycoluril, melamine, melamine cyanurate, dicyandiamide, guanidine and carbodiimides.

The nitrogen synergists are preferably condensates of melamine. Condensates of melamine are, for example, melem, melam or melon, or more highly condensed compounds of this type, and also mixtures thereof, and may be prepared, for example, by a process as described in WO 96/16948.

The phosphorus/nitrogen flame retardants are preferably reaction products of melamine with phosphoric acid or with condensed phosphoric acids or reaction products of condensates of melamine with phosphoric acid or with condensed phosphoric acids, or else mixtures of the products mentioned.

The reaction products with phosphoric acid or with condensed phosphoric acids refer to compounds which are formed by reaction of melamine or of the condensed melamine compounds, such as melam, melem or melon etc., with phosphoric acids. Examples thereof are dimelamine phosphate, dimelamine pyrophosphate, melamine phosphate, melamine pyrophosphate, melamine polyphosphate, melam polyphosphate, melon polyphosphate and melem polyphosphate and mixed polysalts, as described, for example, in WO 98/39306.

The phosphorus/nitrogen flame retardant is more preferably melamine polyphosphate.

The phosphorus/nitrogen flame retardants are preferably nitrogen-containing phosphates of the formulae $(NH_4)_y H_{3-y} PO_4$ or $(NH_4 PO_3)_z$, where y is from 1 to 3 and z is from 1 to 10 000.

The phosphorus/nitrogen flame retardants are preferably ammonium hydrogenphosphate, ammonium dihydrogenphosphate or ammonium polyphosphate.

Useful liquid components are all products which are used or which are additionally used in the particular method of preparing or processing the polymers without disrupting the abovementioned operations. Examples of such liquid additives are monomers which are used in polymerization, polyaddition or polycondensation reactions, solvents which are used in polymer processing, liquid polymeric base products and stabilizers, further flame retardants and other assistants.

Suitable monomers are diols, as used in the preparation of polyesters. Examples are ethylene glycol, 1,2-propanediol, 1,3-propanediol and butanediols.

Suitable monomers are di- and polyamines, as used in the preparation of polyamides. Examples are ethylenediamine, propylenediamine, and tetra-, penta- and hexamethylenediamine.

Suitable monomers are olefinic compounds which are used in polymerization reactions. Examples are styrene or methyl methacrylate.

Suitable monomers are diisocyanates which are used to prepare polyurethanes. Examples are tolylene 2,4-diisocyanate (2,4-TDI), tolylene 2,6-diisocyanate (2,6-TDI), 4,4'-diisocyanatodiphenylmethane (MDI), naphthalene 1,5-diisocyanate (NDI), hexamethylene 1,6-diisocyanate (HDI) and isophorone diisocyanate (IPDI).

Suitable liquid polymeric base products are polyols and polyisocyanates which are used to prepare polyurethanes.

Examples of polyols are polyethylene glycols, polypropylene glycols, polyether polyols and polyester polyols.

Suitable liquid polymeric base products are synthetic resins, which, according to DIN 55958, are understood to refer to synthetic resins which are prepared by polymerization, polyaddition or polycondensation reaction.

Examples are oligomeric and polymeric resins and hardeners, as used in the preparation of unsaturated polyester resins.

Examples of such liquid polymeric base products are solutions of polycondensates of saturated and unsaturated dicarboxylic acids and/or of anhydrides thereof with diols in copolymerizable monomers, preferably styrene or methyl methacrylate.

Examples of liquid polymeric base products are oligomeric and polymeric resins bearing epoxy groups and hardeners, as used in the preparation of epoxy resins.

Examples of liquid epoxy resins are aromatic polyglycidyl esters such as bisphenol A diglycidyl ester, bisphenol F diglycidyl ester, polyglycidyl esters of phenol-formaldehyde resins and of cresol-formaldehyde resins, polyglycidyl esters of phthalic, isophthalic and terephthalic acid, and also of trimellitic acid, N-glycidyl compounds of aromatic amines and of heterocyclic nitrogen bases, and also di- and polyglycidyl compounds of polyhydric aliphatic alcohols.

Examples of liquid hardeners are polyamines such as triethylenetetramine, aminoethylpiperazine and isophoronediamine, polyamidoamines, polybasic acids or their anhydrides, for example phthalic anhydride, hexahydrophthalic anhydride, methyltetrahydrophthalic anhydride, or phenols.

Examples of suitable solvents are acetone, methyl ethyl ketone, alcohols, such as methanol, ethanol, n-propanol, isopropanol, n-butanol, isobutanol, sec-butanol, tert-butanol, n-hexanol, 2-ethylhexanol, water, benzene, toluene, xylenes, esters, dimethylformamide, alkyl glycols, propylene glycol methyl ether acetate, diethylene glycol ethyl ether acetate, polyethylene glycol dimethyl ether, ethyl acetate, butyl acetate, dioxane, tetrahydrofuran, diethyl ether, dimethyl ether, methyl tert-butyl ether, alkanes, cycloalkanes, N-methylpyrrolidone, acetic acid, acetic anhydride, formic acid, propionic acid, benzine, amyl acetate, pyridine, carbon disulfide, dimethyl sulfoxide, dichloromethane, trichloromethane, carbon tetrachloride, nitromethane, N-dimethylacetamide, nitrobenzene.

Suitable liquid flame retardants are triethyl phosphate, triaryl phosphates, tetraphenyl resorcinoldiphosphate, dimethyl methylphosphonate and/or a polymer thereof with phosphorus pentoxide, phosphonate ester, (5-ethyl-2-methyl-dioxaphosphorinan-5-yl)methyl methyl methanephosphonate, phosphoric esters, pyrophosphoric esters, alkylphosphonic acids and/or oxyalkylated derivatives thereof.

The flame retardant formulation preferably contains from 91 to 99.9% by weight of component A, from 0 to 30% by weight of component B and from 0.1 to 9% by weight of component C.

The flame retardant formulation more preferably contains from 93 to 97% by weight of component A, from 0.5 to 20% by weight of component B and from 3 to 7% by weight of component C.

Particular preference is given to ratios which lead to nondusting, free-flowing powders. Such formulations can generally be processed efficiently.

Optionally, dispersion additives may be used in the preparation of the formulations in order to achieve still further improvement in the predispersion of the flame retardants.

To prevent sedimentation, stabilizers may also be added to the formulations. Examples of such stabilizers are sheet silicates and clay minerals, for example bentonites, montmorillonites, hectorites, saponites and precipitated/pyrogenic/crystalline/amorphous silicas.

The preferred process for preparing these flame retardant formulations is the mixing-in of the liquid component by means of a dissolver, stirrer or mixer unit.

The invention also relates to a flame-retardant thermoplastic polymer molding composition prepared by using the inventive flame retardant formulation.

The thermoplastic preferably comprises polymers of the high-impact polystyrene, polyphenylene ether, polyamide, polyester, polycarbonate type and blends or polyblends of the ABS (acrylonitrile-butadiene-styrene) or PC/ABS (polycarbonate/acrylonitrile-butadiene-styrene) or PPE/HIPS (polyphenylene ether/high impact polystyrene) type.

The thermoplastic more preferably comprises polyamides, polyesters and PPE/HIPS blends.

The thermoplastics preferably comprise fillers, for example glass (preferably in pellet or in fiber form), oxides and/or hydroxides of elements of the second and third main group of the Periodic Table of the Elements (preferably aluminum and magnesium), sheet silicates and clay minerals, for example bentonites, montmorillonites, hectorites, saponites, precipitated/pyrogenic/crystalline/amorphous silicas, chalk.

Preferred additives are synergists, antioxidants, light stabilizers, lubricants, colorants, nucleating agents or antistats. Examples of the usable additives are given in EP-A-0 584 567.

The invention also relates to flame-retardant thermoset compositions, which comprise molding compositions, coatings or laminates of thermoset resins, each of which have been produced by means of the inventive flame retardant formulation.

The thermoset resins are preferably unsatured polyester resins, epoxy resins and polyurethanes.

Unsaturated polyester resins are solutions of polycondensates of saturated and unsaturated dicarboxylic acids or of anhydrides thereof with diols in copolymerizable monomers, preferably styrene or methyl methacrylate. UP resins are hardened by free-radical polymerization with initiators (for example peroxides) and accelerants. The double bonds of the polyester chain react with the double bond of the copolymerizable solvent monomer. The most important dicarboxylic acids for preparing the polyesters are maleic anhydride, fumaric acid and terephthalic acid. The most frequently used diols is 1,2-propanediol. Diols additionally used also include ethylene glycol, diethylene glycol and neopentyl glycol. The most suitable monomer for crosslinking is styrene. Styrene is entirely miscible with the resins and can be readily copolymerized. The styrene content in unsaturated polyester resins is normally between 25 and 40%. Instead of styrene, methyl methacrylate may also be used as a monomer.

Epoxy resins are compounds which are prepared by polyaddition reaction of an epoxy resin component and a crosslinking (hardener) componente. The epoxy resin components used are aromatic polyglycidyl esters such as bisphenol A diglycidyl ester, bisphenol F diglycidyl ester, polyglycidyl esters of phenol-formaldehyde resins and of cresol-formaldehyde resins, polyglycidyl esters of phthalic, isophthalic and terephthalic acid, and also of trimellitic acid, N-glycidyl compounds of aromatic amines and of heterocyclic nitrogen bases, and also di- and polyglycidyl compounds of polyhydric aliphatic alcohols. The hardeners used are polyamines such as triethylenetetramine, aminoethylpiperazine and isophoronediamine, polyamidoamines, polybasic acids or anhydrides thereof, for example phthalic anhyride, hexahydrophthalic anhydride, methyltetrahydrophthalic anhydride or phenols. The crosslinking may also be effected by polymerization using suitable catalysts.

Epoxy resins are suitable for the potting of electric and electronic components and for saturation and impregnation operations. In electrical engineering, the epoxy resins used are predominantly flame-retardant and are used for circuit boards and insulators.

According to the prior art hitherto, epoxy resins for circuit boards are rendered flame-retardant by incorporating, by reaction, brominated aromatic compounds, especially tetrabromobisphenol A. A disadvantage is that, in the event of fire, hydrogen bromide (hazardous substance!) is released, which can lead to damage by corrosion. Under unfavorable conditions, polybrominated dibenzodioxines and furans can also form. The use of aluminum hydroxide is completely inappropriate owing to the release of water occurring in the course of processing.

The fire protection of electrical and electronic equipment is laid down in specifications and standards for product safety. In the USA, fire protection testing and approval procedures are carried out by Underwriters Laboratories (UL). The UL specifications are nowadays accepted worldwide. The fire tests for plastics were developed in order to determine the resistance of materials to ignition and flame spread.

Depending on the fire protection requirements, the materials have to pass horizontal fire tests (UL 94 HB) or the strickter vertical tests (UL 94 V-2, V-1 or V-0). These tests simulate low-energy ignition sources which occur in electrical equipment and which can act on plastic parts of electrical modules.

The inventive flame retardant formulations are preferably employed in compounds which are used further to obtain polymer moldings.

Also in accordance with the invention are polymer moldings which have been produced on the basis of the inventive flame retardant formulation. The flame retardant formulation is incorporated into thermoset plastics by homogeneous mixing with the appropriate resin/hardener systems and subsequent hardening and shaping.

The flame retardant formulations may be incorporated into thermoplastic polymers by, for example, premixing all constituents in a mixer and subsequently homogenizing in the polymer melt in a compounding unit (for example a twin-screw extruder). The melt is typically drawn off as an extrudate, cooled and granulated. The components may also be introduced directly into the compounding unit separately via a metering system.

It is equally possible to add the flame retardant formulations to finished polymer granule or powder and to process the mixture directly on an injection molding machine to give moldings.

A universally usable means of determining the flame retardancy of materials has been found to be the determination of the oxygen index. In this test arrangement, a vertical specimen is used to determine the limiting oxygen concentration for burning proceeding vertically. The oxygen index (LOI) was determined in a modified apparatus based on ASTM_D 2863-74.

EXAMPLES

Components Used:

®Alpolit SUP 403 BMT (Vianova Resins GmbH, Wiesbaden), unsaturated polyester resin, about 57% in styrene, acid number max. 30 mg KOH/g, preaccelerated and adjusted to be slightly thixotropic, low viscosity (viscosity in 4 mm flow cup: 110±10 s) and greatly reduced styrene emission.

®Palatal 340 S (DSM-BASF Structural Resins, Ludwigshafen) unsaturated polyester resin, approx. 49% in styrene and methyl methacrylate, density 1.08 g/ml, acid number 7 mg KOH/g, preaccelerated, low viscosity (dynamic viscosity approx. 50 mPa*s).

®Beckopox EP 140 (Vianova Resins GmbH, Wiebaden), low molecular weight condensate of bisphenol A and epichlorohydrin having a density of 1.16 g/ml and an epoxy equivalent of 180-192.

®Beckopox EH 625 (Vianova Resins GmbH, Wiesbaden), modified aliphatic polyamine having an active hydrogen equivalent weight of 73 and a dynamic viscosity of approx. 1 000 mPa*s.

Cobalt accelerant NL 49P (Akzo Chemie GmbH, Düren), cobalt octoate solution in dibutyl phthalate having a cobalt content of 1% by weight.

Butanox M 50 (Akzo Chemie GmbH, Düren), methyl ethyl ketone peroxide, phlegmatized with dimethyl phthalate, clear liquid having an active oxygen content of at least 9% by weight.

®Dowanol PMA (Dow), propylene glycol methyl ether acetate.

®Durethan AKV 30 (Bayer AG, Germany) nylon-6,6 (GFR PA 6.6), contains 30% glass fibers.

®Celanex 2300 GV1/30 (Ticona, Germany) polybutylene terephthalate (GFR PBT), contains 30% glass fibers.

Aluminum salt of diethylphosphinic acid, referred to hereinbelow as DEPAL.

®Melapur 200 (melamine polyphosphate), referred to hereinbelow as MPP, DSM Melapur, Netherlands.

Examples 1-9

With the aid of a mixing apparatus, flame retardant formulations were prepared by initially charging the solid component and introducing the liquid with uniform agitation over 10 min.

TABLE 1

Flame retardant formulations

| Ex. | Solid (component A or A + B) | % by weight | Liquid (component C) | % by weight |
|---|---|---|---|---|
| 1 | DEPAL | 98 | ® Alpolit SUP 403 BMT | 2 |
| 2 | DEPAL | 95 | DMF | 5 |
| 3 | DEPAL | 91 | Styrene | 9 |
| 4 | DEPAL | 95 | ® Beckopox EP 140 | 5 |
| 5 | DEPAL | 95 | methyl ethyl ketone | 5 |
| 6 | DEPAL | 95 | Toluene | 5 |
| 7 | DEPAL | 95 | Dowanol PMA | 5 |
| 8 | DEPAL | 95 | tetraphenyl resorcinol diphosphate | 5 |
| 9 | DEPAL/MPP (1:1) | 95 | tetraphenyl resorcinol diphosphate | 5 |

Examples 10-11 (Comparison)

The unsaturated polyester resin is mixed using a dissolver disk initially with the cobalt accelerant, then with the solid flame retardant (component A). After addition of the peroxy hardener Butanox M 50, homogenization is repeated. In a heated press, two layers of continuous textile glass mat of basis weight 450 g/m² are inserted on a ®Hostaphan release film and a steel frame. Subsequently, about half of the resin/flame retardant mixture is uniformly distributed. After addition of a further glass matt, the remaining resin/flame retardant mixture is distributed, the laminate is covered with a release film, and a pressed slab of thickness 4 mm is produced at a temperature of 50° C. at a pressure of 10 bar over one hour.

Examples 12-15

The production is similar to example 10, except that the flame retardant formulation is used instead of the solid flame retardant (component A).

Table 2 shows comparative examples for the use of DEPAL as a flame retardant for unsaturated polyester resins (Viapal UP 403 BMT and ®Alpolit SUP 403 BMT). It can be seen from the table that, when 25 parts of solid DEPAL are used per 100 parts of unsaturated polyester resin (comparative examples 10-11), relatively low values are obtained for the oxygen index (LOI) and a rough, blemished surface is observed.

The use of DEPAL in the form of a formulation (examples 12-15) allows the achievement of both higher oxygen index values (LOI) and unimpaired surface properties. The laminates may be colored as desired.

TABLE 2

Properties of unsaturated polyester resin laminates, comprising 30% by weight of continuous textile glass mat, Butanox M50 hardener, NL 49 P accelerant, final concentration in each case 25 parts of flame retardant/100 parts of resin

| Example | Flame retardant dispersion | Resin | Surface | LOI |
|---|---|---|---|---|
| 10 (comp.) | DEPAL* | ® Palatal 340 S | rough/blemished | 0.30 |
| 11 (comp.) | DEPAL* | ® Alpolit SUP 403 BMT | rough/blemished | 0.32 |
| 12 | as example 1 | ® Palatal 340 S | smooth/homogeneous | 0.33 |
| 13 | as example 2 | ® Alpolit SUP 403 BMT | smooth/homogeneous | 0.37 |
| 14 | as example 3 | ® Palatal 340 S | smooth/homogeneous | 0.33 |
| 15 | as example 3 | ® Alpolit SUP 403 BMT | smooth/homogeneous | 0.44 |

*as a solid

Example 16 (Comparison)

The epoxy resin Beckopox EP 140 is mixed with the solid flame retardant using a dissolver disk. Addition of the hardener Beckopox EH 625 is followed by homogenization once more. The resin/flame retardant mixture is applied to a steel plate and a glass silk fabric having a basis weight of 86 g/m$^2$ is laid thereon. Subsequently, further resin/flame retardant mixture is applied and a layer of glass silk fabric having a basis weight of 390 g/m$^2$ is laid thereon. This operation is repeated four more times. Subsequently, hardening is effected at 120° C. for 3 h. This gives a laminate of thickness about 3 mm.

Examples 17-20

The production is similar to example 16, except that the flame retardant formulation is used instead of the solid flame retardant (component A).

Table 3 shows the results of epoxy resin laminates based on Beckopox EP 140 resin and Beckopox EH 625 polyamine hardener. The use of the DEPAL flame retardant in the form of a formulation (examples 17-20) allows the achievement of both higher oxygen index values (LOI) and unimpaired surface properties. The inventive laminates also withstand accelerated aging (1 h/120° C./100% rel. humidity) without undesired delamination, which is observed when the solid is used.

TABLE 3

Properties of epoxy resin moldings, material thickness 3.0 mm; 100 parts of Beckopox EP 140 resin, 39 parts of Beckopox EH 625 hardener, final concentration in each case 20 parts of flame retardant/100 parts of resin

| Example | Flame retardant dispersion | 1 h storage at 120° C./100% rel. humidity | Surface | LOI |
|---|---|---|---|---|
| 16 (com.) | DEPAL* | Delamination | Rough/blemished | 0.30 |
| 17 | As example 4 | No delamination | Smooth/homogeneous | 0.38 |
| 18 | As example 5 | No delamination | Smooth/homogeneous | 0.39 |
| 19 | As example 6 | No delamination | Smooth/homogeneous | 0.39 |
| 20 | As example 7 | No delamination | Smooth/homogeneous | 0.41 |

*as a solid

Examples 21-22 (Comparison)

The glass fiber-reinforced polyamide or PBT granule was extruded on a twin-screw extruder (Leistritz LSM 30/34) at temperatures of from 260 to 310° C. (GFR PA 6.6) or from 240 to 280° C. (GFR PBT). The flame retardant powder was metered into the molten polymer mass via a side inlet. The homogenized polymer extrudate was drawn off, cooled in a water bath and subsequently granulated. After sufficient drying, the molding compositions were processed on an injection molding machine (Arburg 320 C Allrounder) at composition temperatures of from 270 to 320° C. (GFR PA 6.6) or from 260 to 280° C. (GFR PBT) to give specimens.

Examples 23-26

The production was similar to example 21, except that the flame retardant formulation was used instead of the solid flame retardant (component A).

It can be seen from table 4 that, when 20% of solid DEPAL (comparative examples 21-22) is used, relatively low values are obtained for the oxygen index (LOI) and a rough, blemished surface is observed. The use of DEPAL in the form of formulations (examples 23-26) allows the achievement of both higher oxygen index values (LOI) and unimpaired surface properties.

TABLE 4

Properties of flame retardant moldings based on polyamide (PA 6.6) or polybutylene terephthalate (PBT); in each case 20% flame retardant content

| Example | Flame retardant dispersion | Polymer | Surface | LOI |
|---|---|---|---|---|
| 21 (Vgl.) | DEPAL* | ® Celanex 2300 GV1/30 | Rough/blemished | 0.30 |
| 22 (Vgl.) | DEPAL* | ® Durethan AKV 30 | Rough/blemished | 0.31 |
| 23 | As example 8 | ® Celanex 2300 GV1/30 | Smooth/homogeneous | 0.38 |
| 24 | As example 9 | ® Celanex 2300 GV1/30 | Smooth/homogeneous | 0.38 |
| 25 | As example 8 | ® Durethan AKV 30 | Smooth/homogeneous | 0.40 |
| 26 | As example 9 | ® Durethan AKV 30 | Smooth/homogeneous | 0.41 |

Examples 27-29 (Invention)

With the aid of a mixing apparatus, flame retardant formulations were produced by initially charging the solid components (DEPAL and MPP) and introducing the liquid with uniform agitation over 10 min.

TABLE 5

Flame retardant formulations

| Ex. | Solid (component A or A + B) | % by weight | Liquid (component C) | % by weight |
|---|---|---|---|---|
| 27 | DEPAL/MPP | 94/1 | ® Alpolit SUP 403 BMT | 5 |
| 28 | DEPAL/MPP | 92/4 | DMF | 4 |
| 29 | DEPAL/MPP | 91/3 | Styrene | 6 |

Laminates were produced in a similar manner to examples 10 to 15.

Table 6 shows the results of epoxy resin laminates based on Beckopox EP 140 resin and Beckopox EH 625 polyamine hardener. The use of the DEPAL plus MPP flame retardant in the form of a formulation (examples 27-29) allows the achievement of both higher oxygen index values (LOI) and unimpaired surface properties. The inventive laminates also withstand accelerated aging (1 h/120° C./100% rel. humidity) without undesired delamination, which is observed when the solid is used.

TABLE 6

Properties of unsaturated polyester resin laminates, comprising 30% by weight of continuous textile glass mat, Butanox M50 hardener, NL 49 P accelerant, final concentration in each case 25 parts of flame retardant/100 parts of resin

| Exampe | Flame retardant dispersion | Resin | Surface | LOI |
|---|---|---|---|---|
| 30 | As example 27 | ® Palatal 340 S | Smooth/homogeneous | 0.39 |
| 31 | As example 28 | ® Alpolit SUP 403 BMT | Smooth/homogeneous | 0.38 |
| 32 | As example 29 | ® Palatal 340 S | Smooth/homogeneous | 0.39 |

*as a solid

What is claimed is:

1. A flame retardant thermoset composition, comprising, a thermoset polymer, wherein the thermoset polymer is selected from the group consisting of unsaturated polyester resins, epoxy resins and polyurethanes and a flame retardant formulation, wherein the flame retardant formulation includes a flame retardant component A, from 90 to 99.9% by weight of phosphinate salt of the formula (I) a diphosphinate salt of the formula (II) a polymer of the phosphinate salt, a polymer of the diphosphinate salt or mixtures thereof

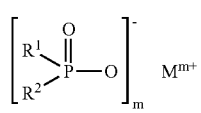

(I)

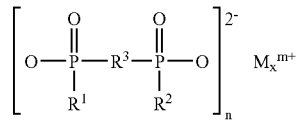

(II)

where
R$^1$, R$^2$ are the same or different and are each C$_1$-C$_6$-alkyl, linear or branched, or aryl;
R$^3$ is C$_1$-C$_{10}$-alkylene, linear or branched, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na or K;
m is from 1 to 4;
n is from 1 to 4;
x is from 1 to 4,
as oomponentB, from 0 to 9.9% by weight of a nitrogen-containing synergist or a phosphorus/nitrogen flame retardantand, as component C, from 0.1 to 10% by weight of a liquid component.

2. The flame retardant thermoset composition as claimed in claim 1, wherein R$^1$, R$^2$ are the same or different and are each C$_1$-C$_6$-alkyl, linear or branched, or phenyl.

3. The flame retardant thermoset composition as claimed in claim 1, wherein R$^1$, R$^2$ are the same or different and are each methyl, ethyl, n-propyl, isopropyl, n-butyl, tert-butyl, n-pentyl or phenyl.

4. The flame retardant thermoset composition as claimed in claim 1, wherein R$^3$ is methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthylene or tert-butylnaphthylene; phenylmethylene, phenylethylene, phenylpropylene or phenylbutylene.

5. The flame retardant thermoset composition as claimed in claim 1, wherein M is an aluminum ion or zinc ion.

6. The flame retardant thermoset composition as claimed in claim 1, wherein component B is a condensate of melamine.

7. The flame retardant thermoset composition as claimed in claim 6, wherein the condensate of melamine is melem, melam, melon or a more highly condensed compound thereof.

8. The flame retardant thermoset composition as claimed in claim 1, wherein, component B is a reaction product of melamine with polyphosphoric acid, a reaction product of a condensate of melamine with polyphosphoric acid or mixtures thereof.

9. The flame retardant thermoset composition as claimed in claim 8, wherein the reaction product is dimelamine pyrophosphate, melamine polyphosphate, melem polyphosphate, melam polyphosphate, melon polyphosphate or mixed polysalts thereof.

10. The flame retardant thermoset composition as claimed in claim 1, wherein component B is melamine polyphosphate.

11. The flame retardant thermoset composition as claimed in claim 1, wherein component C is a diol.

12. The flame retardant thermoset composition as claimed in claim 1, wherein component C is ethylene glycol, 1,2-propanediol, 1,3-propanediol a butanediol or mixtures thereof.

13. The flame retardant thermoset composition as claimed in claim 1, wherein component C is a diamine, polyamine or mixtures thereof.

14. The flame retardant thermoset composition as claimed in claim 1, wherein component C is ethylenediamine, propylenediamine, tetra-, penta-hexamethylenediamine or mixtures thereof.

15. The flame retardant thermoset composition as claimed in claim 1, wherein component C is an olefinic compound.

16. The flame retardant thermoset composition as claimed in claim 1, wherein component C is styrene, methyl methacrylate or mixtures thereof.

17. The flame retardant thermoset composition as claimed in claim 1, wherein component C is a diisocyanate.

18. The flame retardant thermoset composition as claimed in claim 1, wherein component C is tolylene 2,4-diisocyanate (2,4-TDI), tolylene 2,6-diisocyanate (2,6-TDI), 4,4'-diisocyanatodiphenylmethane (MDI), naphthalene 1,5-diisocyanate (NDI), hexamethylene 1,6-diisocyanate (HDI) isophorone diisocyanate (IPDI) or mixtures thereof.

19. The flame retardant thermoset composition as claimed in claim 1, wherein component C is a polyol, polyisocyanate or mixtures thereof.

20. The flame retardant thermoset composition as claimed in claim 1, wherein component C is selected from the group consisting of polyethylene glycols, polypropylene glycols, polyether polyols, polyester polyols and mixtures thereof.

21. The flame retardant thermoset composition as claimed in claim 1, wherein component C is a solution of polycondensates of saturated and unsaturated dicarboxylic acids or of anhydrides thereof with diols in copolymerizable monomers.

22. The flame retardant thermoset composition as claimed in claim 21, wherein the copolymerizable monomers are styrene or methyl methacrylate.

23. The flame retardant thermoset composition as claimed in claim 1, wherein component C is an oligomeric and polymeric resin bearing epoxy groups and hardeners.

24. The flame retardant thermoset composition as claimed in claim 1, wherein component C is selected from the group consisting of bisphenyl A diglycidyl ester, bisphenol F diglycidyl ester, polyglicidyl esters of phenol-formaldehyde resins and cresol-formaldehyde resins, polyglycidyl esters of phthalic, isophthalic terephthalic acid, or trimellitic acid, N-glycidyl compounds of aromatic amines or of heterocyclic nitrogen bases, and di- and polyglycidyl compounds of polyhydric aliphatic alcohols.

25. The flame retardant thermoset composition as claimed in claim 1, wherein component C is selected from the group consisting of triethylenetetramine, aminoethylpiperazine, isophoronediamine, polyamidoamine, polybasic acids, anhydrides of polybasic acids, phthalic anhydride, hexahydrophthalic anhydride, methyltetrahydrophthalic anhydride phenols and mixtures thereof.

26. The flame retardant thermoset composition as claimed in claim 1, wherein component C is selected from the group consisting of acetone, methyl ethyl ketone, alcohols, water, benzene, toluene, xylenes, esters, dimethylformamide, alkyl glycols, propylene glycol methyl ether acetate, diethylene glycol ethyl ether acetate, polyethylene glycol dimethyl ether, ethyl acetate, butyl acetate, dioxane, tetrahydrofuran, diethyl ether, dimethyl ether, methyl tert-butyl ether, alkanes, cycloalkanes, N-methylpyrrolidone, acetic acid, acetic anhydride, formic acid, propionic acid, benzine, amyl acetate, pyridine, carbon disulfide, dimethyl sulfoxide, dichloromethane, trichloromethane, carbon tetrachloride, nitromethane, N-dimethylacetamide, and nitrobenzene.

27. The flame retardant thermoset composition as claimed claim 1, wherein component C is a liquid flame retardant.

28. The flame retardant thermoset composition as claimed in claim 1, wherein component C is selected from the group consisting of triethyl phosphate, triaryl phosphates, tetraphenyl resorcinoldiphosphate, dimethyl methylphosphonate or a polymer thereof with phosphorus pentoxide, phosphonate ester, (5-ethyl2-methyl-dioxaphosphorinan-5-yl)methyl methyl methanephosphonate, phosphoric esters, pyrophosphoric esters, alkylphosphonic acids oxyalkylated derivatives thereof and mixtures thereof.

29. The flame retardant thermoset composition as claimed in claim 1, further comprising from 91 to 99.9% by weight of component A, from 0 to 8.9% by weight of component B and from 0.1 to 9% by weight of component C.

30. The flame retardant thermoset composition as claimed in claim 1, further comprising from 93 to 97% by weight of component A, from 0.5 to 4.0% by weight of component B and from 3 to 7% by weight of component C.

31. A process for preparing the flame retardant thermoset composition as claimed in claim 1, comprising the step of mixing the components with a dissolver stirrer unit or a tumbling mixer.

32. A process for preparing the flame retardant thermoset composition as claimed in claim 31, wherein the mixing step further comprises mixing at least one additive.

33. The process for preparing the flame retardant thermoset composition as claimed in claim 31, wherein the at least one additive is selected from the group consisting of sheet silicates, clay minerals, bentonites, montmorillonites, hectorites, saponites and precipitated/pyrogenic/crystalline/amorphous silicas.

34. A polymer article comprising the flame retardant thermoset composition as claimed in claim 1.

35. The polymer article as claimed in claim 34, wherein the polymer article is selected from the group consisting of a polymer molding, polymer film, polymer thread and polymer fiber.

* * * * *